F. W. WOOD.
ILLUMINATED ANNOUNCEMENT AND DISPLAY SIGNAL.
APPLICATION FILED JUNE 17, 1908.
974,943.
Patented Nov. 8, 1910.
3 SHEETS—SHEET 1.
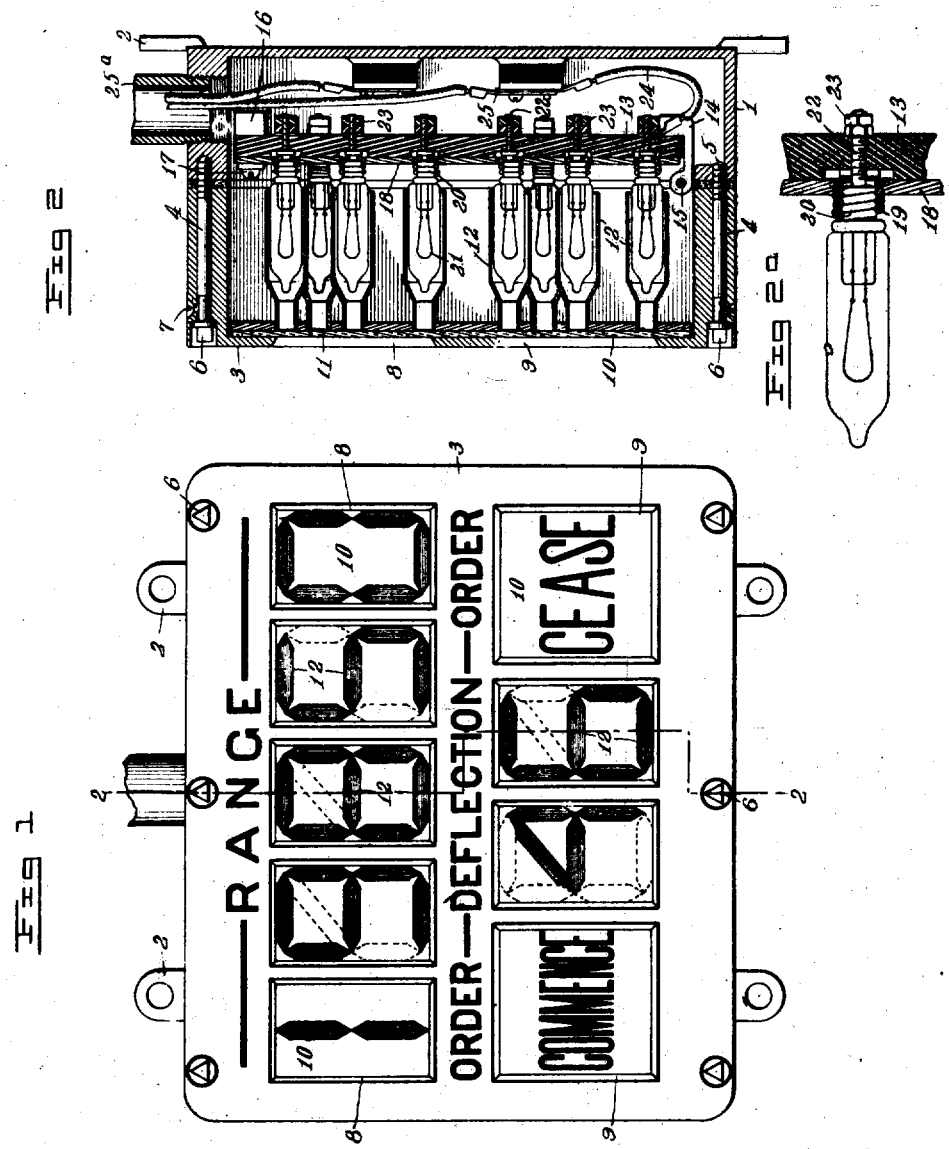

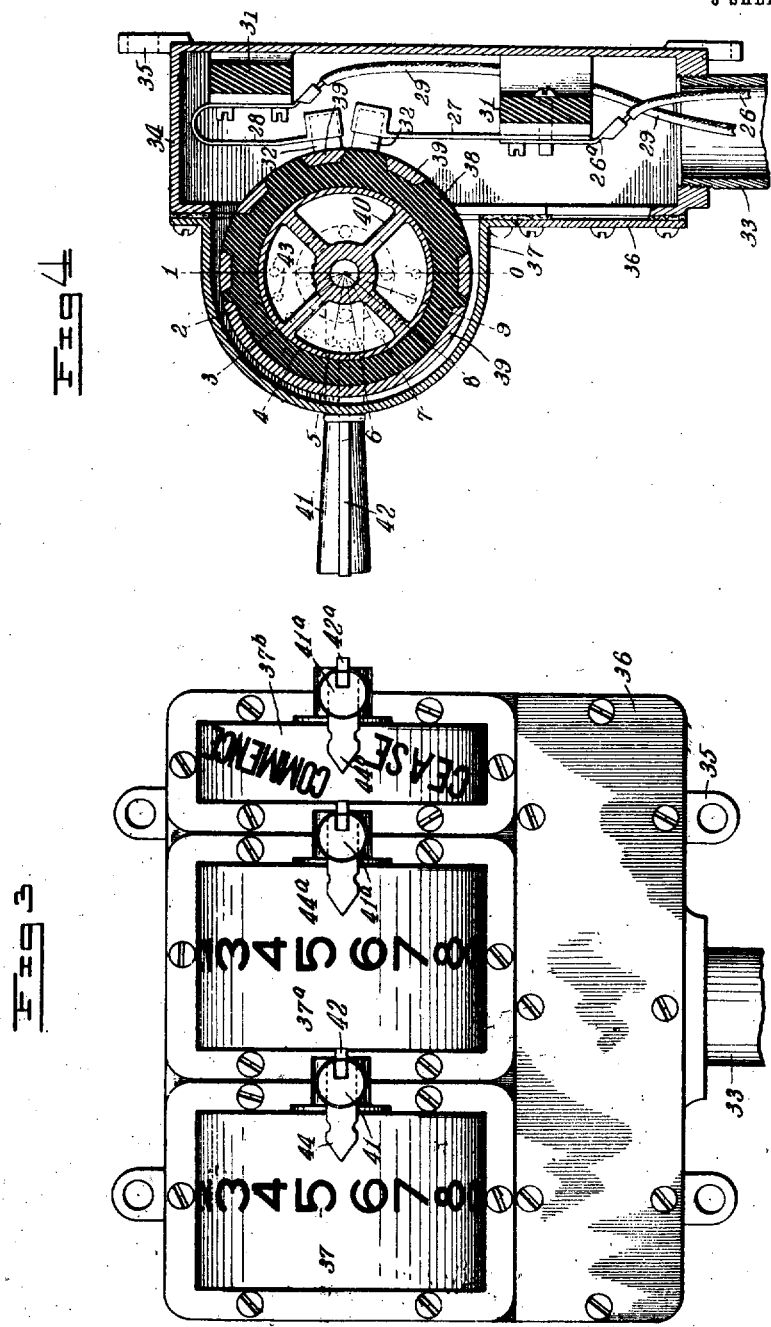

F. W. WOOD.
ILLUMINATED ANNOUNCEMENT AND DISPLAY SIGNAL.
APPLICATION FILED JUNE 17, 1908.
974,943.
Patented Nov. 8, 1910.
3 SHEETS—SHEET 3.
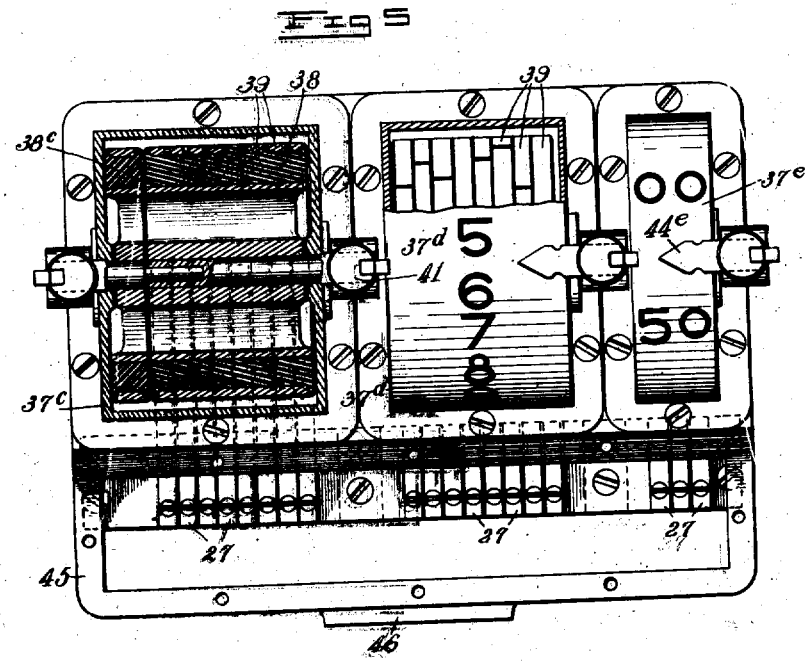
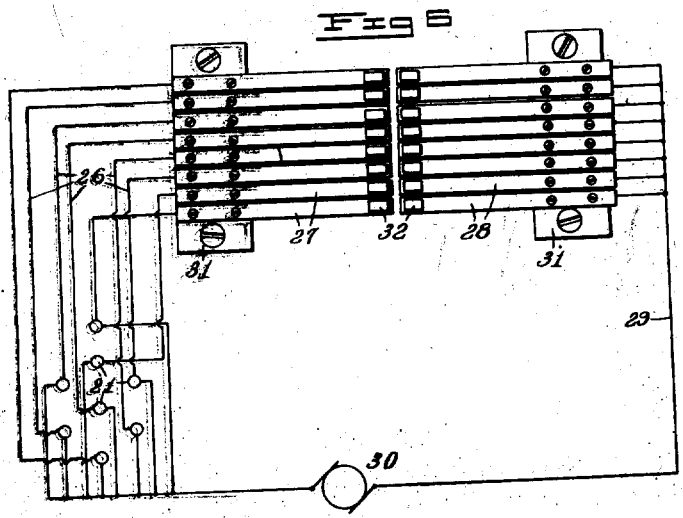
Witnesses
H. A. Robinette
J. Hanson Boyden
Inventor
Frank W. Wood
By Mayers, Cushman & Rea
Attorney

UNITED STATES PATENT OFFICE.

FRANK W. WOOD, OF NEWPORT NEWS, VIRGINIA, ASSIGNOR TO CHARLES CORY & SON, OF NEW YORK, N. Y.

ILLUMINATED ANNOUNCEMENT AND DISPLAY SIGNAL.

974,943.  Specification of Letters Patent.  Patented Nov. 8, 1910.

Application filed June 17, 1908. Serial No. 438,998.

*To all whom it may concern:*

Be it known that I, FRANK W. WOOD, a citizen of the United States, residing at Newport News, in the county of Warwick and State of Virginia, have invented new and useful Improvements in Illuminated Announcement and Display Signals, of which the following is a specification.

This invention relates to illuminated character electric signaling devices of that type wherein the signal is produced by means of groups of electric lamps disposed in certain characteristic formations, and more particularly to devices of this class designed especially for use in transmitting orders or intelligences from one point to another.

In the numerous attempts which have heretofore been made to produce a signal display system of this character, one of the principal difficulties encountered has been the necessity for providing a very large number of electric lamps, and hence a corresponding number of independent circuits, for each letter, figure or character produced.

The primary object of this invention is therefore to reduce to a minimum the number of lamps employed within a given field to produce the various characters required, and to this end I form such characters by means of certain elementary blocks of light so constructed and arranged that the characters will be clearly and distinctly outlined.

A further object of the invention is to provide an improved transmitting or controlling device by means of which the circuits of the various lamps are selected and closed and the various orders or signals thus produced.

A further object of the invention is to so arrange the various parts that ready access may be had to the mechanism for inspection and repair, and to so construct the apparatus that it will consist of the fewest possible number of parts, and therefore be durable, practical, and easy to maintain.

With the above and other objects in view, and to improve generally upon the details of such apparatus, my invention consists in the construction and arrangement of parts hereinafter described, and illustrated in the accompanying drawings in which:—

Figure 1 is a front view of the signal displaying apparatus. Fig. 2 is a transverse section therethrough on line 2—2. Fig. 2ª is a fragmentary sectional detail on an enlarged scale, showing the construction of lamp socket which I prefer to employ. Fig. 3 is a front view of one of the transmitting or signal controlling devices. Fig. 4 is a transverse section therethrough. Fig. 5 is a front view of a slightly different form of transmitting device, some parts being shown in section, and others being broken away, for the sake of clearness. Fig. 6 is a diagram illustrating the arrangement of circuits employed.

Referring to the drawings in detail, and more particularly to Figs. 1 and 2 thereof, my improved illuminated signal displaying apparatus comprises a casing consisting of a base section 1, provided with lugs 2 by means of which it may be supported, and a cover section 3, secured to the other section by means of bolts 4. By reference to Fig. 2, it will be seen that these bolts comprise shanks extending centrally through the walls of the cover section, and terminating at one end in screw-threaded portions 5, which engage the walls of the base section, and provided at the other end with polygonal heads 6, adapted to receive a suitable key. Set screws 7, work in annular grooves in the shanks of these bolts and prevent them from falling out of their holes when the cover section is removed.

In the front of the casing is formed two series of sight openings or windows 8, 9, under which extends a sheet 10 of translucent material, such as ground glass or the like. Immediately back of this glass is disposed a plate 11 having secured thereto a number of separate compartments or cells 12. These compartments preferably have their front ends narrower than their body portions, and are arranged within each sight opening in certain configurations so as to produce the characters desired, as hereinafter explained.

Disposed within the casing 1 is a plate 13, of insulating material, supported at one end by means of a hinge 14 pivoted at 15 to a lug carried by the casing. At its other end, the plate 13 abuts against a lug 16 formed on the wall of the casing and is held in position by means of a screw 17, as clearly shown in Fig. 2. Secured to, and coextensive with the plate 13 is a metallic plate 18, preferably formed of brass or copper. To this plate 18 are secured lamp sockets 19 which, as shown in Fig. 2ª, preferably consist of helical coils of wire, one end of which is soldered directly to the plate 18. This method of constructing the lamp sockets is desirable for the reason that it affords a resilient support for the lamps, and prevents them from being loosened by excessive vibration. Lamps 21, provided with bases 20, are screwed into these sockets, as shown in Fig. 2, and project into the respective cells or compartments 12, so as to be substantially enveloped thereby. Conducting pins or bolts 22 extend through the plate of insulating material, and have their heads in contact with the center of the base of each lamp so as to form one of the terminals of the lamp. Clamping nuts 23 are secured to the other end of these bolts, and serve to hold one end of flexible leads 24, the other ends of which are connected to terminal blocks 25, from which wires extend through a conduit 25ª to a suitable transmitting or controlling device.

Referring again to Fig. 1, the novel arrangement of the lamp compartments will be readily understood. The apparatus shown in this figure is especially designed for use on war ships and the like, for transmitting to the gunners information relating to the distance and direction of a target, and also orders as to firing. To this end, I arrange the upper series of windows 8 to indicate the range, in yards, and the lower series to indicate the angle or deflection, in degrees, and also the orders. It is found in practice that a five-place number is sufficient for the purpose of indicating the range, and of course a two-place number always suffices for indicating degrees of deflection.

By means of the special monogram arrangement of character elements, which I have devised, any digit can be formed within the field defined by any sight opening or window, as, for example, those indicating deflections. As clearly shown in Fig. 1, the end of each lamp compartment or cell is shaped to form an elongated rectangle having pointed ends. These cells are so grouped in each window as to form a rectangular frame-work comprising two cells on each side, and one at each end. In order to complete the combination of elements necessary to produce all the digits, I arrange one additional cell horizontally across the middle of the rectangle so outlined, and a second additional cell diagonally across the upper half of the rectangle. The arrangement constitutes, in reality, a pair of adjacent rectangles having a common side, and a diagonal across one of the rectangles.

It will thus be seen that by illuminating certain combinations of these cells, any desired digit whatever can be produced and clearly outlined by blocks of light. In Fig. 1, under the heading "Deflection," I have for example illustrated the two digits "4" and "6" in the ten's and unit's place respectively, thus indicating an angle of 46 degrees.

While in some instances it may be necessary or desirable to arrange in each of the sight openings employed the lamp cells in the manner just described, still in the present instance it has been found in practice that this is unnecessary in all of the sight openings, for indicating range. For example, the range is never read more closely than by 50's. Therefore, in the units place, it is only necessary to arrange the cells so as to produce the figure "0", while in the tens place the two figures "0" and "5" are all that is required. Similarly, in the extreme left hand window, which indicates the tens of thousands, it is only necessary to arrange the cells to produce the numeral "1", since the range never exceeds this amount. In the example illustrated in Fig. 1, the range is indicated as 19,850 yards. It is evident that, in practice, any number of yards below this amount can be indicated, the steps being by 50's.

As for the sight openings 9 at the right and left of the deflection signal, the words "Cease" and "Commence" may be written directly on the ground glass or other translucent material, and when the lamp beneath such sight opening is illuminated, the characters will be brightly defined and can be easily read.

As a means for selecting and controlling the various lamp circuits so as to produce the desired signal, I preferably employ the transmitting devices illustrated in Figs. 3, 4 and 5. That illustrated in Fig. 3, is employed for transmitting the deflection indications and orders, while that in Fig. 5 is used for transmitting the range indications.

Fig. 4 may be considered as a central transverse section through either Fig. 3 or Fig. 5, as the detailed construction of the two transmitters is the same, the parts differing only in arrangement. For the sake of clearness, a number of the same reference characters have been preserved in the two forms.

Referring, however, first to Fig. 6, it will be seen that the lamps 21 belonging to the compartments of each sight opening are connected by a number of individual wires 26 to a series of spring arms 27, supported on a suitable block of insulating material, 31. In direct alinement with the spring arms 27 is another corresponding set 28, also mounted on a block 31, of insulating material. All of the arms 28 are connected to a common wire 29, which extends to one side of a suitable source of current 30, from the other side of which extends a common return wire to each of the lamps 21.

As clearly shown in Fig. 4, each of the brushes 27 and 28 is provided at its end with a cup or socket in which is seated a block or brush 32, preferably of carbon. These carbon brushes bear upwardly against the periphery of a controlling drum 38. This drum is formed of insulating material, and has embedded in its periphery contact strips 39, preferably of copper, so arranged that when in a certain position, each strip will serve to bridge a corresponding pair of brushes 32, and thus connect the associated spring arms 27, 28.

The contact drum 38 is preferably mounted on hollow, metallic spiders 40, to each of which is attached an operating handle 41, provided with a locking lever 42, which lever carries at its lower end a detent (not shown) adapted to engage with any one of a series of openings 43, (see Fig. 4) formed in the frame of the machine, all of which parts operate in a well known manner to lock the handle and drum in any desired position, as will be obvious. One of these drums, with its controlling handle, is provided for each monogram field or sight opening of which it is the transmitter. For instance, in Fig. 3 there are three such drums one for the tens, and one for the units of the deflection indications, and one for the orders, while in Fig. 5 there are shown four such drums, for the range indications, two of which are arranged to produce any digit whatever, while the extreme left hand drum 28$^e$ controls only the digit "1" shown at the extreme left hand of Fig. 1, and the right hand drum 37$^e$ controls the units and tens sight opening of Fig. 1, jointly.

The spring arms 27 and 28 and their associated contact brushes are arranged in casings 34, 45, provided with lugs 35 by means of which they may be supported. Removable cover plates 36 are provided for the casings, and over each drum is a semi-cylindrical guard or shield 37, 37$^a$, 37$^b$, etc. On these guards are written the various characters which it is desired to transmit, and pointers 44, 44$^a$, etc., are attached to the respective operating levers and serve to indicate to the operator when the corresponding drum is in a position to produce the desired signal. Suitable conduits, such as 33, may extend from the casings 34, 45, for carrying the wires to the receiver shown in Fig. 1.

In practice, the two transmitters shown in Figs. 3 and 5 are preferably arranged close together so that they may be simultaneously manipulated by the same operator, and wires from both of these transmitters are preferably led to the single receiving and displaying device shown in Fig. 1. If desired, however, other arrangements may be employed, as my invention is not limited to the specific type of apparatus or the particular class of signals or orders which it is desired to transmit.

My invention consists, however, broadly in the novel and effective arrangements of cells, compartments or character elements shown in Fig. 1, and in the construction of the transmitting drums and associated parts. By reference to Fig. 1, it will be noted particularly that with my arrangement of lamp cells, only eight lamps are required to form a monogram capable of producing any digit whatsoever, and that in some cases where every digit is not required, I may be able to dispense with certain of these lamps and thereby further reduce the number.

It will thus be seen that I have produced a very simple and effective apparatus for transmitting signals or intelligences of all kinds, and it is thought that the numerous advantages of my invention will be readily appreciated by those skilled in the art.

What I claim is:—

1. A monogrammic illuminated character device comprising lamp cells arranged to form the outline of a pair of adjacent rectangles, having a common side and one of said rectangles having a diagonal each side of said rectangles and said diagonal being formed of a continuous, straight bar of light.

2. A monogrammic illuminated character device capable of producing any digit and comprising elongated lamp cells, so arranged as to form a single pair of rectangular frames having a common side and one of said rectangular frames having a diagonal, a single cell constituting each side of each rectangle and said diagonal.

3. A monogrammic illuminated character device capable of producing any digit and comprising elongated lamp cells so arranged as to form a single pair of rectangular frames having a common side and a diagonal across one of said frames.

4. An illuminated character display device comprising lamp cells arranged to produce character forming elements, each element consisting of an elongated rectangle having pointed ends, said ends being symmetrically fitted together at each corner, and a lamp cell forming a diagonal of one of the rectangles.

5. In an illuminated electric signal device having a series of lamps, a composite plate comprising a metal face and insulating back, a series of lamp sockets adapted to receive the bases of said lamps and each comprising a helical coil of wire set into an opening in the metal face of said plate, pins projecting through the insulating backing of said plate opposite each opening and contacting with the bottom of said lamp bases, and wires secured to said pins so as to form one terminal for said lamps, the said metal face constituting a common conducting plate, and serving as the other terminals of said lamps.

6. In an illuminated character display system for displaying numbers, a display device comprising a group of translating devices arranged to form digits, a transmitter for controlling said groups comprising a casing carrying fixed contacts connected to said translating devices, a plurality of axially alined rotary drums coöperating therewith to control the translating devices, concentric guards for said drums removably mounted on said casing, rotatable operating handles for said drums, indicia on the face of said guards defining character forming positions, and indexes on said handles which move over said indicia.

7. In an illuminated character display system for displaying numbers, a display device comprising a group of translating devices arranged to form digits, a transmitter for controlling said groups comprising a casing carrying fixed contacts connected to said translating devices, a plurality of axially alined rotary drums coöperating therewith to control the translating devices, independently removable concentric guards for said drums mounted on said casing and in which said drums are mounted, rotatable operating handles for said drums, indicia on the face of said guards defining character forming positions, and indexes on said handles which move over said indicia.

In testimony whereof I have hereunto set my hand in presence of two subscribing witnesses.

FRANK W. WOOD.

Witnesses:
ARTHUR L. BRYANT,
J. HANSON BOYDEN.